US010264461B2

(12) United States Patent
Aijaz (10) Patent No.: US 10,264,461 B2
(45) Date of Patent: Apr. 16, 2019

(54) RADIO RESOURCE SLICING IN A RADIO ACCESS NETWORK

(71) Applicant: Kabushiki Kaisha Toshiba, Minato-ku (JP)

(72) Inventor: Adnan Aijaz, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/441,564

(22) Filed: Feb. 24, 2017

(65) Prior Publication Data

US 2017/0318468 A1    Nov. 2, 2017

(30) Foreign Application Priority Data

Apr. 27, 2016 (GB) .................................. 1607355.3

(51) Int. Cl.
*H04W 16/10* (2009.01)
*H04W 72/04* (2009.01)
*H04W 16/04* (2009.01)

(52) U.S. Cl.
CPC ....... *H04W 16/10* (2013.01); *H04W 72/0433* (2013.01); *H04W 72/0486* (2013.01); *H04W 16/04* (2013.01)

(58) Field of Classification Search
CPC ............. H04W 16/10; H04W 72/0486; H04W 72/0433; H04W 16/04
See application file for complete search history.

(56) References Cited

U.S. PATENT DOCUMENTS

| | | | |
|---|---|---|---|
| 8,874,125 B2 | 10/2014 | Mahindra et al. | |
| 2008/0225774 A1* | 9/2008 | Kim | H04L 5/0037 370/315 |
| 2012/0051296 A1 | 3/2012 | Kokku et al. | |
| 2013/0336206 A1* | 12/2013 | Farhadi | H04W 4/70 370/328 |
| 2017/0034841 A1* | 2/2017 | Bethanabhotla | H04W 28/08 |

OTHER PUBLICATIONS

United Kingdom Search Report dated Nov. 3, 2016 in GB application 1607355.3, filed on Apr. 27, 2016.
Ravi Kokku et al "CellSlice: Cellular Wireless Resource Slicing for Active RAN Sharing", 2013 $5^{th}$ International Conference on Communication Systems and Networks, 2013, 10 pages.

(Continued)

*Primary Examiner* — Joseph E Dean, Jr.
(74) *Attorney, Agent, or Firm* — Oblon, McClelland, Maier & Neustadt, L.L.P.

(57) ABSTRACT

A method of providing radio resources to a number of communication flows in a radio access network that comprises a slice controller and a plurality of base stations. The method comprises in the slice controller abstracting radio resources that are available to the plurality of base stations and dynamically allocating the abstracted radio resources to a number of isolated slices, each slice accommodating one or more of the communication flows and communicating the radio resource allocations to the base stations. The method further comprises, in the base stations, performing application specific customisation radio resources within an allocated slice.

16 Claims, 8 Drawing Sheets

(56) References Cited

OTHER PUBLICATIONS

Ravi Kokku, et al., "NVS: A Substrate for Virtualizing Wireless Resources in Cellular Networks", IEEE/ACM Transactions on Networking, vol. 20, No. 5, Oct. 2012, pp. 1333-1346.
Mohamad Kalil, et al., "Wireless Resources Virtualization in LTE Systems", IEEE INFOCOM Workshop on Mobile Cloud Computing, Apr. 2014, 6 Pages.
Jun He, et al., "AppRAN: Application-Oriented Radio Access Network Sharing in Mobile Networks", Mobile and Wireless Networking Symposium, IEEE ICC, Jun. 2015, pp. 3788-3794.
Gautam Bhanage, et al., "VNTS: A Virtual Network Traffic Shaper for Air Time Fairness in 802.16e Systems", IEEE ICC, May 2010, 6 Pages.
Liang Zhao, et al., "LTE Virtualization: from Theoretical Gain to Practical Solution", Proceedings of the 2011 $23^{rd}$ International Teletraffic Congress, Sep. 2011, pp. 71-78.

* cited by examiner

| Algorithm for RL-based Radio Resource Slicing Strategy |  |
|---|---|
| 1: | Initialization |
|  | $time \leftarrow 0$; Q-values $\leftarrow 0$ |
|  | Input X, M, T |
| 2: | Execute Algorithm for initial resource slicing |
| 3: | Iterate |
| while (*learning period is active*) do | |
|     for *each slice* do | |
|         observe state s | |
|         *explore* with probability $\varepsilon$ | |
|         *exploit* with probability $(1-\varepsilon)$ | |
|         $R^* \leftarrow 0$; $v \leftarrow 0$ | |
|         while (*slice m in state s*) do | |
|             observe $R_T$ | |
|             $R^* \leftarrow R^* + \alpha^v \cdot R_T$; $v \leftarrow v + 1$ | |
|         end | |
|         observe state s* | |
|         update Q-values | |
|         $time \leftarrow time + v$ | |
|     end | |
| end | |

Figure 4

| Algorithm for Initial Resource Slicing |  |
|---|---|
| 1: | Input: $\{X, W_B^m, W_R^m\}$ |
| 2: | Overall resource demand<br>$W_O^m = W_R^m + W_B^m / (\theta R_m)$ |
| 3: | Slice Allocation<br>allocate resource units to $m^{th}$ slice based on $W_O^m$ |

RADIO RESOURCE SLICING IN A RADIO ACCESS NETWORK

FIELD

Embodiments described herein relate generally to the dynamic slicing of radio resources in a radio access network.

BACKGROUND

Future 5G cellular networks are expected to support a range of use cases, spanning different vertical industries. It is likely that not all of these use cases will share the same service requirements. It is likely that the traditional 'one-size-fits-all' cellular approach will not allow to reliably fulfil these service requirements. Therefore, one of the key challenge for 5G networks is how one network, based on a common physical infrastructure, can be efficiently shared among different vertical application sectors.

The industry presently believes that 'network slicing' is likely to be indispensable in future 5G cellular networks in order to provide the required design flexibility. Network slicing creates multiple logical networks over a common physical infrastructure. Each of these networks is or can be tailored to specific needs of a use case. Network slicing includes slicing of both radio access (wireless) and core (wired) networks.

Radio resource slicing can be enabled through virtualization of radio resources. Such virtualization-based radio resource slicing must be able to achieve tight isolation, provide application-specific customization, and ensure efficient utilization across different radio slices. Compared to virtualization in the wired domain, unique challenges get introduced when virtualizing wireless/radio resources. Firstly, co-existence of bandwidth-based and resource-based reservations is not straightforward. This is because the bandwidth achieved by a slice from a given amount of radio resources directly varies with the channel quality of users. Secondly, the uplink traffic makes it difficult to achieve the conflicting goals of isolation and high-utilization across slices due to the fact that traffic originates at the user devices. Thirdly, wireless networks often incur considerable overhead due to retransmissions which must be properly accounted for as otherwise utilization of a base station would be affected.

BRIEF DESCRIPTION OF THE DRAWINGS

In the following, embodiments will be described with reference to the drawings in which.

DETAILED DESCRIPTION

According to an embodiment a method of providing radio resources to a number of communication flows in a radio access network that comprises a slice controller and a plurality of base stations is provided. The method comprises in the slice controller abstracting radio resources that are available to the plurality of base stations and dynamically allocating the abstracted radio resources to a number of isolated slices. Each slice accommodates one or more of the communication flows. The radio resource allocations are communicated to the base stations. The method further comprises performing, in the base stations, application specific customisation radio resources within an allocated slice.

The base stations provide information of available radio resources to the scheduler. It is emphasised that, in an embodiment, it is only the radio resources that are being abstracted and that no abstraction of the base station takes place. In an embodiment the customisation of allocated radio resources takes place freely/in the absence of influence from the scheduler. This maximises scheduling benefits, leaves room for further innovation in radio resource scheduling (e.g. to accommodate haptic communication) and allows using legacy base stations in combination with the slicing controller without requiring protocol modification to the legacy base stations. This makes implementation of the embodiment easy.

The application specific customisation of radio resources by the base station may include uplink and/or downlink customisation of the radio resources.

In the embodiment a slice, once allocated, remains dedicated to the application it has been allocated to.

The embodiment does not need to employ admission control mechanisms to ensure isolation between slices and thereby avoiding degradation of quality-of-service.

In an embodiment the base stations provide i) information regarding communications traffic demand and/or ii) an average effective transmission rate of one or more slices and/or iii) modulation and/or coding schemes used in slice and/or iv) a bandwidth demand of resources for a given slice and/or v) current utilization information of radio resources allocated to a given slice and/or parameters required to calculate sum utility and/or an average effective transmission rate to the slice controller.

In an embodiment the slice controller determines an initial slice allocation and, based upon feedback from the base stations dynamically determines an updated slice allocation using reinforced learning.

The use of reinforced learning allows developing an independent slicing mechanism/slicing period for each slice. This allows dealing with the highly dynamic nature of wireless environment in which the choice of a single fixed slicing period would lead to sub-optimal results. Through the use of reinforced learning high resource utilization is achieved even in highly dynamic wireless environments.

In an embodiment the slicing controller is configured to rank applications and to prioritise allocation of radio resources to one or more applications that are ranked more highly than other applications for which radio resource are to be allocated.

In one embodiment the initial slice allocation is determined by the slice controller on the basis of an indication of an average effective transmission rate of the slice received from a base station, a modulation and coding scheme employed and the bandwidth required for transmission.

In another embodiment there is provided a radio access network comprising a slice controller and a plurality of base stations. The base stations are configured to transmit an indication of available radio resources to the slice controller. The slice controller is configured to abstract the radio resources available to the plurality of base stations and dynamically allocate the abstracted radio resources to a number of isolated slices. Each slice accommodates one or more communication flows. The slice controller is further configured to communicate the radio resource allocations to the base stations. The base stations are configured to receive radio resource allocations from the slice controller and to perform independent application specific customisation of radio resources within an allocated slice.

In an embodiment the slice controller is further configured to determine an initial slice allocation, to receive feedback from the base stations, to, based on the received feedback, dynamically determine an updated slice allocation using reinforced learning and to transmit the updated slice allocation to the base station.

In an embodiment the slice controller comprises or is communicatively connected to a vertical application mapping module that stores information of vertical applications desired to be transmitting via the radio access network and/or a radio access network knowledge base storing real-time global information of the RAN.

According to another embodiment there is provided a slice controller for use in a radio access network that comprises the slice controller and a plurality of base stations. The slice controller is configured to receive an indication of radio resources available to the base stations, abstract the available radio resources, dynamically allocate the abstracted radio resources to a number of isolated slices, each slice accommodating one or more communication flow, and communicate the radio resource allocations to the base stations for independent and application specific customisation of radio resources within an allocated slice.

In an embodiment current utilization is measured as ratio of used resource units over allocated resource units.

According to another embodiment there is provided a method of operating a slice controller in a radio access network comprising the slice controller and a plurality of base stations. The method comprises, at the slice controller, receive an indication of radio resources available to the base stations, abstract the available radio resources, dynamically allocate the abstracted radio resources to a number of isolated slices, each slice accommodating one or more communication flow and communicate the radio resource allocations to the base stations for independent and application specific customisation of radio resources within an allocated slice.

According to another embodiment there is provided a computer program product comprising computer executable instructions that, when executed by one or more processors, causes the one or more processors to perform the steps of any of the methods described above.

5G cellular networks will support a range of use cases, spanning different vertical industries, not all of which share the same service requirements. One challenge is how one network, based on a common physical infrastructure, can be efficiently shared among different vertical applications. It is believed that 5G networks must be designed in a flexible manner to cater for the requirements of different vertical applications. Such flexibility would be possible through 'network slicing', which creates multiple logical networks over a common physical infrastructure by allocating available radio resources to individual isolated virtual networks/network slices, with each network tailored towards the specific need of a use case. Software-Defined Networking (SDN) and Network Function Virtualization (NFV) technologies are likely to play a role in realizing network slicing. Network slicing involves slicing of both radio access networks and core networks. One challenge for radio resource slicing is to ensure tight isolation, provide application-specific customization, and ensure efficient utilization across different slices in dynamically changing wireless environments.

It was realised that radio resource slicing is particularly important for 5G due to the following reasons:

It ensures that radio resources are allocated to critical applications without any external competition. A separate radio slice can be allocated to such applications, which remains dedicated for any ongoing operation.

It enables the implementation of application-specific radio resource scheduling algorithms.

Since the allocated slice is isolated from the rest of radio resources, such radio resource slicing enables secure resource allocation for various applications.

It comes as a natural solution for various software-defined networking and cloud based architectural approaches for radio access network (RAN), which are increasingly gaining popularity for 5G network design.

One way of achieving radio resource slicing is through independent slicing of resources at the base station level. However, such techniques have various limitations. Firstly, they require modifications to legacy base station schedulers. Secondly, from a resource utilization perspective, such approaches perform sub-optimally as user distribution, average user channel conditions, and user-traffic requirements may vary significantly across base stations over fine timescales.

It was therefore realised that, in order to create effective RAN slicing, network-wide radio resource slicing across multiple base stations is much more attractive. Such network-wide radio resource slicing not only provides dynamic allocation of resources across a set of base stations but also hold minimum footprint for wide-scale adoption by requiring minimal changes to legacy base stations. It should be noted that network-wide radio resource slicing can be logically achieved in an entity located at a higher level (compared to the base station) in mobile network hierarchy.

In one embodiment the following steps are performed:
a) Abstraction of Radio Resources—Only radio resources and not the complete base station are abstracted. This ensures minimal changes to legacy LTE-A (Long Term Evolution—Advanced) cellular standard for implementation.
b) Dynamic Resource Slicing—A dynamic radio resource slicing strategy is provided, based on a reinforcement learning (RL) approach. This approach implicitly accounts for slice dynamics. The slicing entity (slicing controller) not only learns the optimal size of each slice but also updates it dynamically.
c) Customization at Base Stations—The base station scheduling decisions are neither directly nor indirectly influenced. Customization of slices is left to base stations. This approach results in more robust scheduling decisions for different applications.

d) Minimal Architectural Enhancements—Minimal architectural enhancements are required. The embodiment can be easily implemented in any standard cloud computing infrastructure close to the edge of the radio access network (RAN).

Radio Resource Slicing Framework

Overview

Figure 1:
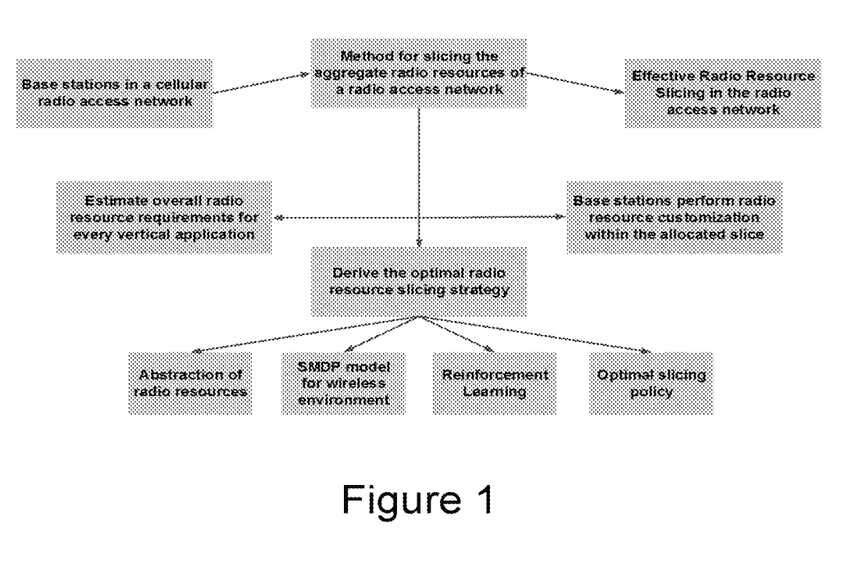
FIG. 1 shows the overall block/flow diagram of an embodiment.

A high-level block/flow diagram of an embodiment is given in FIG. 1. As shown in the figure, the embodiment provides a method for achieving network-wide radio resource slicing in a cellular radio access network. The embodiment provides a central solution that is deployed in an apparatus at the edge of the radio access network. The embodiment can be easily implemented in standard mobile-edge computing infrastructure closer to the edge of the RAN. The RAN edge offers a service environment with low latency and provides direct access to real-time network information for exploitation by the slicing controller.

The base stations in the cellular radio access network share the radio resources available in the network. Using the method of the embodiment for slicing the aggregate radio resources of the RAN, as indicated in the centre rectangle at the very top of FIG. 1, the radio resources are sliced.

The method estimates the overall radio resource requirements for every vertical application/communication flow and, on the basis of this estimate, develops a resource slicing strategy. It is then left to the base stations to perform radio resource customization within the slice allocated centrally by the method.

In the embodiment the method estimates the overall radio resource requirement for every vertical application, abstracts available radio resources, taking into account the base stations that form part of the radio access network, defines a semi-Markov Decision Process (SMDP) model as basis for a reinforced learning approach to enable dynamically allocating the radio resources, thus creating an optimised slicing policy. It is emphasised that it is the base station that performs the radio resource customisation within the allocated slice in a fashion independent form the process allocating radio resources to the slice, so that the base stations of the radio access network are not themselves also virtualised. This is advantageous as it allows the use of legacy base stations.

Figure 2A:
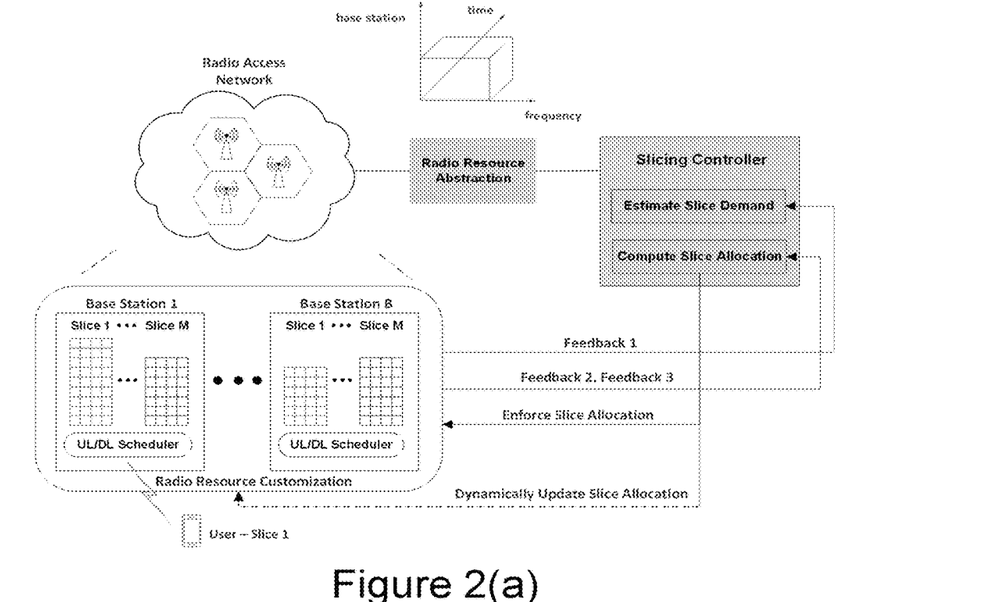
FIG. 2(a) shows the architecture of radio resource slicing in a cellular access network, with UL denoting uplink traffic and DL denoting downlink traffic.
Figure 2B:
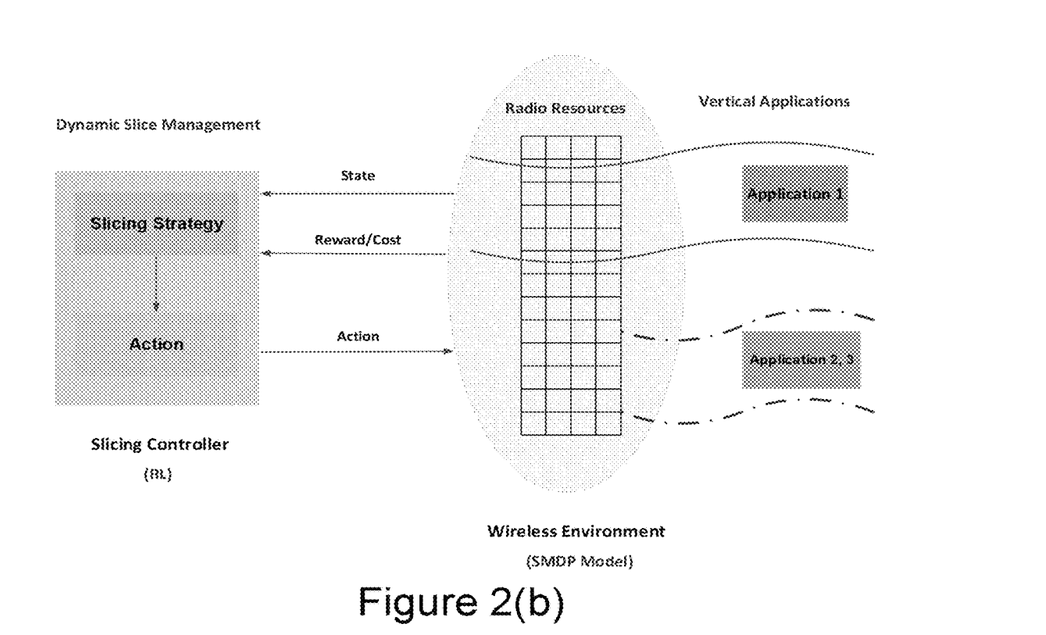
FIG. 2(b) illustrates a radio resource slicing methodology of an embodiment.

As shown in the FIG. 2, the embodiment provides a slicing controller within a generic 5G cellular network. This slicing controller is responsible for radio resource slicing and dynamically allocates radio resources for every vertical application at each base station. The base stations then perform autonomous customization of allocated radio resources according to the requirements of the vertical application. The base station may also be responsible for independently controlling the power used for transmitting data within the slice, granting random access to users of the network and establishing transmission sessions. The slicing controller obtains feedback (Feedback 1 in FIG. 2(a)) from base stations to estimate overall resource requirement for a slice.

The slicing controller initially computes slice allocation for a slice based on overall utilization of the radio resource pool and the quality-of-service requirements of a slice. For computing initial slice allocation, the slicing controller obtains feedbacks (Feedback 2 and 3 in FIG. 2(a)) from the radio access network. The slicing controller dynamically updates the slice allocation over discrete time steps.

The sequence of steps undertaken by the slicing controller is described in more detail in the following:

Step 1: Radio Resource Abstraction

If the 5G network comprises 'B' base stations and needs to support 'M' different vertical applications M different radio resource slices are required. Let, 'X' denote the overall radio resource pool. The overall radio resource pool can be abstracted in different ways. In the embodiment the radio resources are abstracted through a 3-dimensional (3D) resource grid wherein radio resources are distributed in time, frequency, and spatial (base station) domains, as shown in FIG. 2(a).

Step 2: SMDP Model of Wireless Environment

In the embodiment reinforced learning (RL) methods are used to determine an optimised slicing policy. Reinforced learning methods are applicable to Markov Decision Processes or variants thereof. To account for slice dynamics the embodiment initially models radio resource as a semi-Markov Decision Process (SMDP), which is particularly suited to wireless environments. The interaction of the slicing controller with the wireless environment is represented in the SM DP model as follows:

State: The state(s) of a slice is represented by three parameters: resource allocation, sum utility, and resource utilization.

Action: In each state, an action (a) is performed by the slicing controller. However, not all the actions are feasible in a given state. The action taken by the slicing controller ensures whether the xth resource unit (minimum possible resource allocation for a slice) is allocated to the mth slice at the bth base station or not.

Transition Probability: The wireless environment perceives the action and transitions to a new state s*. The state dynamics are characterized by the transition probability $P(s,s^*)$.

Reward Function: The state transition yields a reward (R) for the mth slice. This reward is fed back to the slicing controller (see FIG. 1). In an embodiment, the reward function R is expressed as a sum of a slice utility and a slice utilization function such that:

$$R(s,a)=c_1 \cdot U(s,a)+c_2 \cdot \psi(s,a) \quad (1)$$

where $U(s,a)$ and $\psi(s,a)$ respectively denote the sum utility and resource utilization associated with the trigger of action a in state s, and $c_1$ and $c_2$ are constants within [0,1] and enable balancing sum utility or resource utilization. The choice of function for quantifying sum utility is not limiting to the preferred embodiment.

The ultimate objective of the slicing controller is to find the optimal slicing strategy (which is a mapping from set of states to set of actions) which maximizes the expected long-term discounted reward for each state. In one embodiment this is achieved using the SM DP model. The state transition probability depends on a number of factors such as traffic load, user arrival and departure rates, session and mobility management algorithms and/or protocols, etc and therefore, cannot be easily obtained in wireless environments. It was found that in this context, reinforced learning is exceptionally suitable for deriving the optimal slicing strategy as it does not require the expectation of reward/cost and the state transition probability to be known a priori. Among the various existing reinforced learning algorithms, Q-learning is selected due to its simplicity. However, other reinforced learning techniques may be used and the embodiment is not limited to Q-learning.

Step 3: State Initialization

Figure 3:
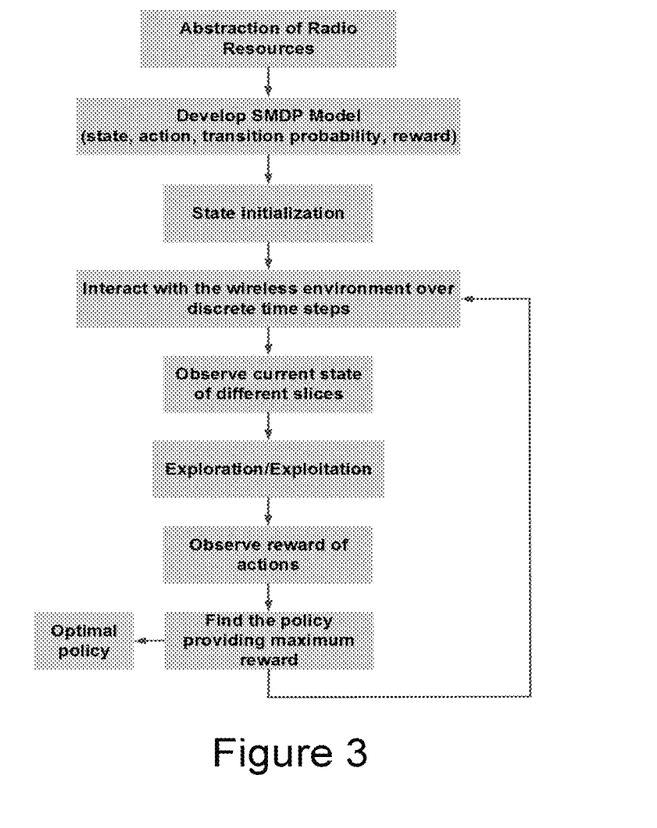
FIG. 3 illustrates steps for finding an optimal radio resource slicing strategy.
Figure 4:
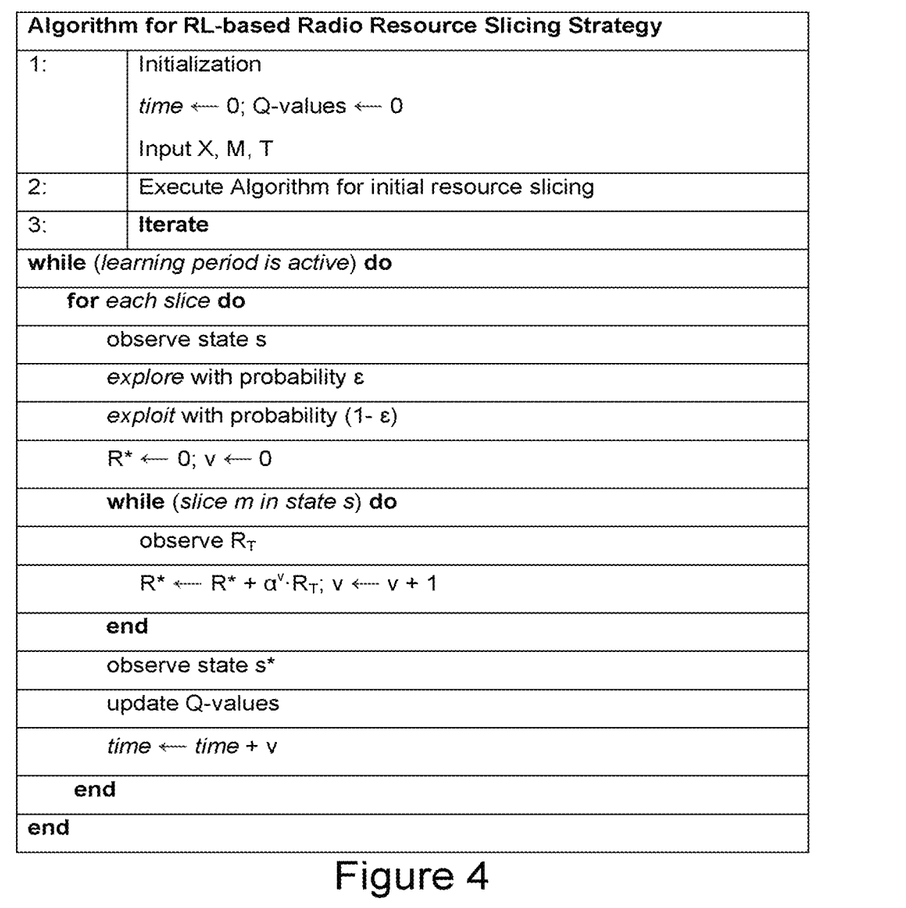
FIG. 4 shows a reinforced learning based slicing strategy.

The slicing controller interacts with the wireless environments over discrete time steps of duration T. The duration T is fixed for one iteration of the process shown in FIGS. 3 and 4 and may be changed in later iterations. The embodiment attempts to find the optimal strategy that maximizes the action-value function (i.e. the Q-value in the embodiment in which Q-learning is used) of each state. With Q-learning, the slicing controller learns the optimal Q-values iteratively, based on the available information. The overall slicing strategy is illustrated in FIGS. 3 and 4, wherein $R_T$ denotes single time-step reward, R* denotes accumulation of all single time-step rewards, and a denotes the discount factor.

Figure 5:
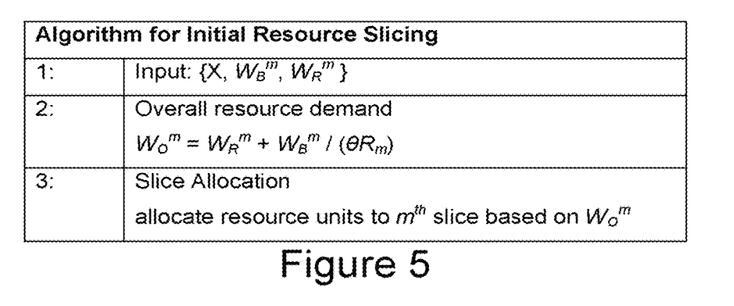
FIG. 5 shows an algorithm for initial resource slicing of an embodiment.

Initially, the Q-values are set to zero. Before the application of the Q-learning algorithm, the slicing controller performs an initial slice allocation for different slices based on traffic demand estimation for each slice, as received through Feedback 1 shown in FIG. 2(a). In the embodiment a combination of bandwidth-based and resource-based provisioning of resources for each slice is used, although in other embodiments other approaches may be used. In the bandwidth-based approach, resource allocation to each slice is defined in terms of aggregate throughput that will be obtained by the flows of that slice. The conversion from bandwidth-based requirements to resource based requirements is shown in FIG. 5. The resource-based approach allocates a fraction of overall resources to each slice.

The initial slicing is performed based on Feedback 1 from the base stations. Let $F_j^m$ denote the set of flows for the $m^{th}$ slice at the $b^{th}$ base station. Further, let $G_j$ denote the minimum required bandwidth for the $j^{th}$ flow. The overall bandwidth demand for $m^{th}$ slice is given by $W_B^m = \Sigma_b \Sigma_{j \in F_b^m} G_j$. In case of resource-based provisioning, Feedback 1 contains the demand in terms of fraction of resources from the overall resource pool.

The bandwidth requirements of a slice are translated to radio resource requirements according to the transmission rate of the slice. The transmission rate of the slice is determined through the base rate, which refers to the minimum supported rate by a base station based on the lowest order supported modulation and coding scheme (MCS). The information about base rate and lowest order supported MCS is known a priori and embedded in the Feedback 1. The slicing controller allocates resource units to different slices in proportion to the overall resource demand. The initial resource slicing is illustrated in FIG. 5, wherein X denotes the overall resource pool, $W_B^m$ denotes bandwidth-based provisioning, $W_R^m$ denotes resource-based provisioning, $R_m$ denotes the transmission rate for the $m^{th}$ slice, and θ denotes the MCS index.

Step 4: Derivation of Optimal Strategy

The slicing controller interacts with the wireless environments over discrete time steps of fixed duration T. After initial slice allocation, the slicing controller performs two distinct types of actions based on an ε-greedy strategy. This strategy operates in exploration mode with probability ε i.e., randomly selects one of the possible actions to enhance its future decisions. In the embodiment the scheduler is moreover configured to operate in exploitation mode to preferring actions it had tried in the past and found effective. In exploitation mode a probability (1−ε) is used. To maintain isolation, the slicing controller is configured to ensure that the same resource unit is not allocated to two different slices. This is ensured through a binary constraint.

The state of each slice is observed at each time-step. If the network is in state s, action a is maintained and the discounted accumulation of single time-step rewards is updated. However, if the state of slice has changed to s*, action a is terminated, and Q-values are updated until the end of learning period.

With Q-learning, the slicing controller learns the optimal strategy iteratively. The state of each slice is observed at each time-step. At time-step time, the slicing controller in state s selects action a. As a result, it earns a reward R* which refers to the discounted accumulation of all single time-step rewards $R_T$, received while executing action a for a duration T. At time-step time+v (as the action can span several time-steps), if the network is in state s, action a is maintained and discounted accumulation of all single time-step rewards is updated. However, if the state of the slice has changed to s*, action a is terminated, and Q-values are updated until the end of the learning period.

Note that the reward function, given by equation (1) comprises a utility term and a utilization terms. In this respect, Feedbacks 2 and 3 (see FIG. 2(a)) provide necessary information to the slicing controller for periodically updating the slicing strategy. Feedback 2 provides current utilization of radio resources allocated to the $m^{th}$ slice at a base station. The resource utilization is measured as the ratio of used resource units to the allocated resource units. Feedback 3 provides the necessary parameters for calculating the sum utility of a slice. In case of rate-based utility, Feedback 3 provides the average effective transmission rate for the $m^{th}$ slice. The slicing controller maps it to a specific utility function. In an embodiment a sigmoid utility function given by:

$$U(\text{rate}) = 1/(1 + \exp(-c_3(\text{rate} - c_4)) \quad (2)$$

is adopted. $c_3$ and $c_4$ are constants within [0,1]. On the other hand, delay-based utility is given by the following utility function:

$$U(\text{delay}) = -c_5 \times \tan h(0.5 \times \text{delay} - 1.35), \quad (3)$$

where $c_5$ is a constant within [0,1].

Step 5: Customization of Radio Resources

The base stations perform customization of radio resources within the allocated slice for a vertical application. Customization means implementing application-specific radio resource scheduling algorithms for uplink and downlink traffic. Since a slice is isolated from rest of the resource pool, optimal scheduling can be achieved through such slice-specific customization. In the embodiment, customization of the allocated radio resources within the slice is left independently to the base stations. It should be noted that although independent customization is done at base stations, the slicing controller allocates radio resources to a slice based on its utility requirements.

Figure 6:
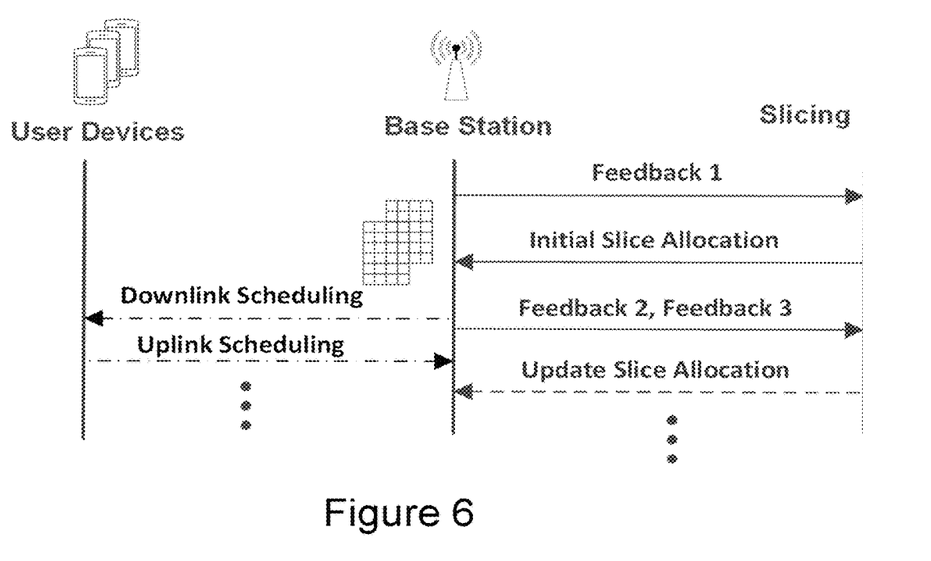
FIG. 6 illustrates a message exchange between different entities of the embodiment.

The exchange of messages between different entities in the embodiment is illustrated in FIG. 6. As can be seen, initial slice allocation is based on Feedback 1 received from the base stations. The base stations customize radio resources within the slice using the radio resources allocated to the slice by the slice controller and independently performs the required downlink and uplink scheduling. Feedbacks 2 and 3 are provided during the operation of the base stations and, should it be determined in the above fashion that slice allocation needs to be changed, the slicing controller provides updated slice allocation to the base stations for further use.

Architectural Aspects

Figure 7:
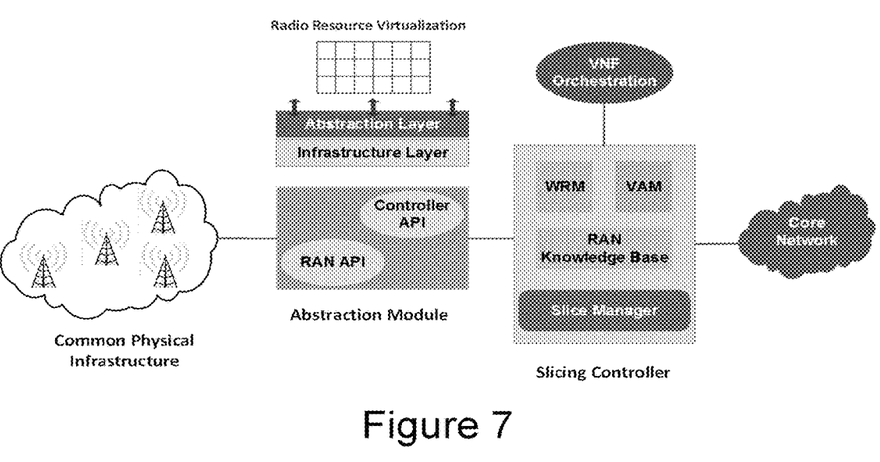
FIG. 7 provides a logical representation of an architecture of an embodiment.

The embodiment use a centralized architectural approach as shown in FIG. 7. The architecture comprises three main components, a slicing controller, an abstraction module and a virtual network function (VNF) Orchestration Module. The slicing controller consists of a Slice Manager, a Wireless Resource Manager (WRM), a Vertical Application Mapping (VAM) Module and a RAN knowledge base.

The abstraction module adds an abstraction layer over the common physical infrastructure to create the virtualized radio resource pool. Note that the overall radio resource pool can be abstracted in different ways. Alternative to creating the above described 3D resource grid, a cluster of base stations can be created and the resources available within each cluster can be abstracted, for example by using the 3D resource grid. As discussed above, the embodiment uses a 3D resource grid abstraction, wherein radio resources are distributed in a time, frequency, and spatial (base station) domains. It is emphasized again that the level of abstraction is limited to radio resource and not to the whole base station. The abstraction module consists of two distinct APIs (application programming interfaces): a RAN API for the physical infrastructure, and a controller API, for the slicing controller. The APIs provide interfaces for respective bi-directional communication between the slicing controller and the RAN. The slicing controller is configured to communicate the slicing decisions to the RAN through the RAN API. Similarly, the controller API provides the required Feedbacks 1, 2, and 3 for slicing decisions.

The slicing controller is configured to maintain a global view of the RAN in the RAN Knowledge Base. The slicing controller comprises an input configured receiving data relating to the RAN and to use received data to update the RAN Knowledge Base. The slicing controller further comprises an interface through which it is configured to provide the optimised slicing strategy for radio resources in the above described manner. The Vertical Application Mapping (VAM) module is configured to maintain a catalogue of vertical applications and comprises an output interface through which it is configured to identify these application to the slicing manager for radio slice mapping. A network operator can notify new applications to the VAM for management thereby and the VAM comprises an input interface through which it is configured to receive such notifications from the network operator.

The slice manager is configured to implement the reinforced learning algorithm to derive the optimal slicing strategy. The RAN knowledge base is configured to maintain a real-time global view of the RAN by periodic updates received via Feedbacks 1, 2, 3 from the base stations, which are received through the controller API of the abstraction module. The RAN knowledge base is configured to keep record of relevant parameters pertaining to utility and utilization of different slices, and to facilitate the slice manager in dynamically updating the slicing strategy. It is also configured to maintain information of the resource demands of various slices along with network operator's preferences of prioritizing different slices. The slice manager is configured to feed the optimal strategy to the wireless resource manager (WRM), which is responsible for allocating radio resources to different slices. Further, the slicing decisions are communicated to the base stations through the RAN API of the abstraction module.

The VNF orchestration module is used to monitor, manage, and troubleshoot the VNF software of the slicing controller.

From a physical implementation perspective, the embodiment can be easily implemented in standard mobile-edge computing infrastructure, which provides cloud computing capabilities at the edge of the RAN.

It will be appreciated that in one embodiment one or more or all of the abstraction module, the controller API, the RAN API, the slicing controller, the slice manager, the WRM, the VAM and the RAN Knowledge Base are implemented as software modules, wherein computer executable software code is stored in a storage device and wherein the one or more or all of the above components are implemented by a processor receiving the executable software code from the memory device and executing the software code.

Performance Validation

The embodiment has been validated through system-level simulation studies. The simulated model is based on a 7-cell hexagonal grid running two vertical applications in two managed radio slices. The first slice provides connectivity for haptic communications while the second slice is dedicated to conventional human-to-human (H2H) communications. Users for both applications are randomly distributed according to a Poisson distribution. The channel model accounts for small-scale Rayleigh fading, large-scale path loss, and shadowing. Moreover, specific utility functions have been adopted for both slices. For H2H communications, we adopt a rate-based utility function. However, for haptic communications, the utility is dictated jointly by rate and delay based utility functions. In terms of traffic dynamics, a time-varying birth-death process was adopted. This determines the active number of traffic flows at any time instant.

Figure 8:
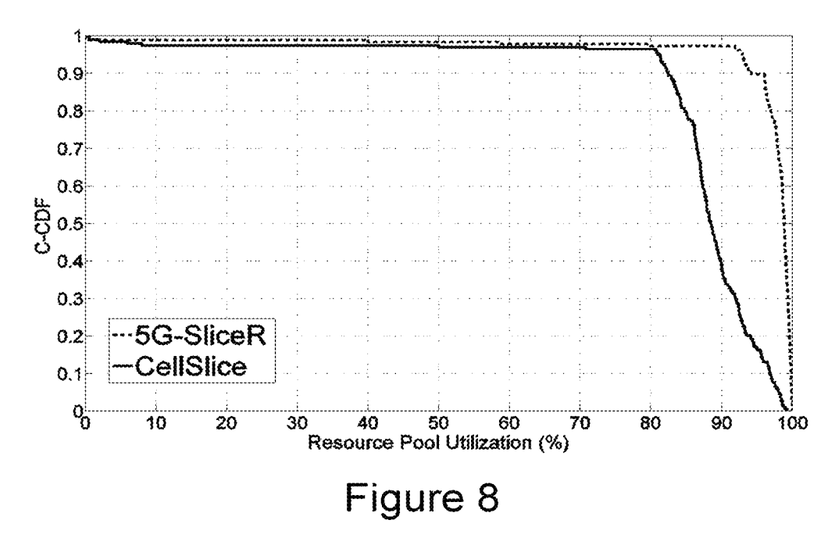
FIG. 8 shows simulation results for the C-CDF of overall radio resource pool utilization.
Figure 9:
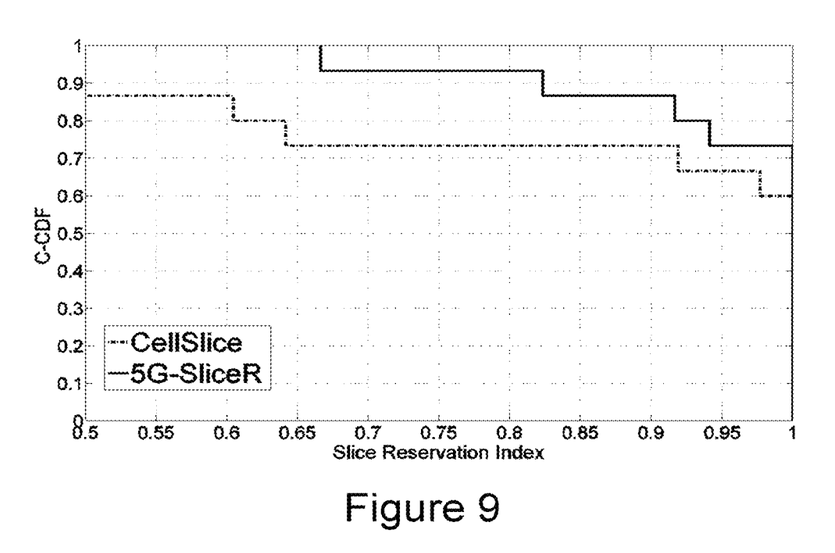
FIG. 9 shows the simulated C-CDF of slice reservation index (SRI) which measures how well the slice allocation requirements of different slices are fulfilled.
Figure 10:
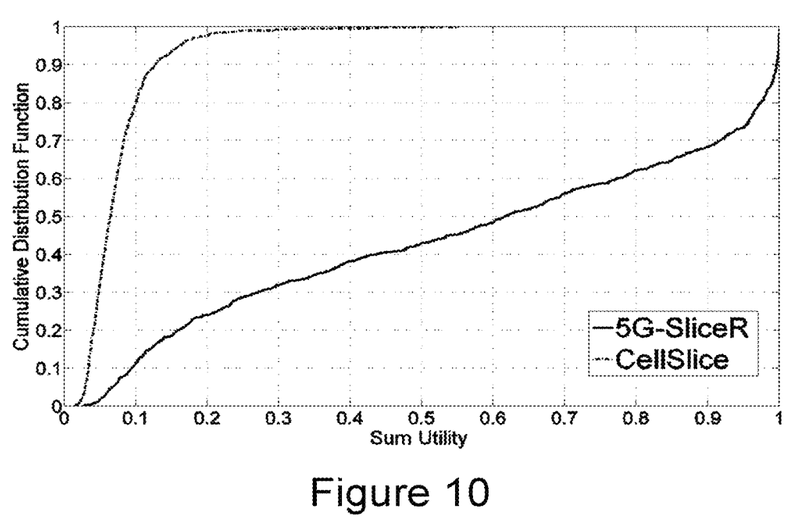
FIG. 10 shows the simulated C-CDF of sum utility.

FIGS. 8-10 show the performance of the embodiments as simulated in terms of different metrics and when compared to the CellSlice technique disclosed by Kokku et. Al (Ravi Kokku, Rajesh Mahindra, Honghai Zhang and Sampath Rangarajan, CellSlice: Cellular Wireless Resource Slicing for Active RAN Sharing, IEEE Comsnets, January 2103). CellSlice is a gateway-level solution for wireless resource virtualization. CellSlice indirectly influences the base station scheduling decisions in uplink and downlink to impose slice-specific resource allocation. In the figures the data relating to the embodiment are referred to as 5G-SliceR.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method of providing radio resources to a number of communication flows in a radio access network supporting different vertical applications, the method comprising:
   abstracting, by slice circuitry, radio resources that are available to a plurality of base stations, the abstracted radio resources being distributed in time, frequency and spatial domains, the slice circuitry and the plurality of base stations being included in the radio access network;
   creating, by the slice circuitry, multiple logical networks over a common physical infrastructure by dynamically allocating the abstracted radio resources to a number of isolated slices, each slice allocated to one of the different vertical applications, accommodating one or more of the communication flows and being isolated from the remainder of the radio resources;
   communicating, by the slice circuitry, the radio resource allocations to the base stations; and
   performing, by the base stations, application specific customization of radio resources within an allocated slice.

2. The method as claimed in claim 1, wherein said base stations provide i) information regarding communications traffic demand, and/or
ii) an average effective transmission rate of one or more slices, and/or
iii) modulation and/or coding schemes used in slice, and/or
iv) a bandwidth demand of resources for a given slice, and/or
v) current utilization information of radio resources allocated to a given slice and/or parameters required to calculate sum utility and/or an average effective transmission rate to the slice circuitry.

3. The method as claimed in claim 1, wherein the slice circuitry determines an initial slice allocation and, based upon feedback from the base stations dynamically determines an updated slice allocation using reinforcement learning.

4. The method as claimed in claim 3, wherein the initial slice allocation is determined by the slice circuitry on the basis of an indication of an average effective transmission rate of the slice received from a base station, a modulation and coding scheme employed and the bandwidth required for transmission.

5. The method as claimed in claim 3, wherein the slice circuitry is configured to define a semi-Markov Decision Process (SMDP) model as basis for the reinforcement learning.

6. A radio access network that supports different vertical applications, the network comprising:
  slice circuitry; and
  a plurality of base stations, wherein
  the base stations are configured to transmit an indication of available radio resources to the slice circuitry,
  the slice circuitry is configured to:
    abstract the radio resources available to the plurality of base stations, the abstracted radio resources being distributed in time, frequency and spatial domains;
    create multiple logical networks over a common physical infrastructure by dynamically allocating the abstracted radio resources to a number of isolated slices, each slice allocated to one of the different vertical applications, accommodating one or more communication flows and being isolated from the remainder of the radio resources; and
    communicate the radio resource allocations to the base stations, and the base stations are further configured to receive radio resource allocations from the slice circuitry and to perform independent application specific customization of radio resources within an allocated slice.

7. The radio access network as claimed in claim 6, wherein the slice circuitry is further configured to determine an initial slice allocation, to receive feedback from the base stations, to, based on the received feedback, dynamically determine an updated slice allocation using reinforcement learning and to transmit the updated slice allocation to the base station.

8. The radio access network as claimed in claim 6, wherein the slice circuitry comprises or is communicatively connected to vertical application mapping circuitry that stores information of vertical applications desired to be transmitting via the radio access network and/or a radio access network knowledge base storing real-time global information of the RAN.

9. The radio access network as claimed in claim 7, wherein the slice circuitry is configured to define a semi-Markov Decision Process (SMDP) model as basis for the reinforcement learning.

10. Slice circuitry for use in a radio access network comprising slice circuitry and a plurality of base stations and supporting different vertical applications, the slice circuitry being configured to:
  receive an indication of radio resources available to the base stations;
  abstract the available radio resources, the abstracted radio resources being distributed in time, frequency and spatial domains;
  create multiple logical networks over a common physical infrastructure by dynamically allocating the abstracted radio resources to a number of isolated slices, each slice allocated to one of the different vertical applications, accommodating one or more communication flows and being isolated from the remainder of the radio resources; and
  communicate the radio resource allocations to the base stations for independent and application specific customization of radio resources within an allocated slice.

11. The slice circuitry as claimed in claim 10, further configured to
  determine an initial slice allocation,
  receive feedback from the base stations,
  dynamically determine, based on the received feedback, an updated slice allocation using reinforcement learning, and
  transmit the updated slice allocation to the base station.

12. The slice circuitry as claimed in claim 10, the slice circuitry further comprising, or the slice circuitry being in communicative connection with:
  vertical application mapping circuitry that stores information of vertical applications desired to be transmitting via the radio access network and/or a radio access network knowledge base storing real-time global information of the RAN.

13. The slice circuitry as claimed in claim 11, wherein the slice circuitry is configured to define a semi-Markov Decision Process (SMDP) model as basis for the reinforcement learning.

14. A method of operating slice circuitry in a radio access network supporting different vertical applications, the method comprising:
  receiving, by slice circuitry, an indication of radio resources available to a plurality of base stations, the slice circuitry and the plurality of base stations being included in the radio access network;
  abstracting, by the slice circuitry, the available radio resources, the abstracted radio resources being distributed in time, frequency and spatial domains;
  creating, by the slice circuitry, multiple logical networks over a common physical infrastructure by dynamically allocating the abstracted radio resources to a number of isolated slices, each slice allocated to one of the different vertical applications, accommodating one or more communication flows and being isolated from the remainder of the radio resources; and
  communicating, by the slice circuitry, the radio resource allocations to the base stations for independent and application specific customization of radio resources within an allocated slice.

15. A non-transitory computer readable medium including executable instructions, which when executed by a computer cause the computer to execute a method of providing radio resources to a number of communication flows in a radio access network supporting different vertical applications, the method comprising:
- abstracting, by slice circuitry, radio resources that are available to a plurality of base stations, the abstracted radio resources being distributed in time, frequency and spatial domains, the slice circuitry and the plurality of base stations being included in the radio access network;
- creating, by the slice circuitry, multiple logical networks over a common physical infrastructure by dynamically allocating the abstracted radio resources to a number of isolated slices, each slice allocated to one of the different vertical applications, accommodating one or more of the communication flows and being isolated from the remainder of the radio resources;
- communicating, by the slice circuitry, the radio resource allocations to the base stations; and
- performing, by the base stations, application specific customization of radio resources within an allocated slice.

16. A non-transitory computer readable medium including executable instructions, which when executed by a computer cause the computer to execute a method of operating slice circuitry in a radio access network supporting different vertical applications, the method comprising:
- receiving, by the slice circuitry, an indication of radio resources available to a plurality of base stations, the slice circuitry and the plurality of base stations being included in the radio access network;
- abstracting, by the slice circuitry, the available radio resources, the abstracted radio resources being distributed in time, frequency and spatial domains;
- creating, by the slice circuitry, multiple logical networks over a common physical infrastructure by dynamically allocating the abstracted radio resources to a number of isolated slices, each slice allocated to one of the different vertical applications, accommodating one or more communication flows and being isolated from the remainder of the radio resources; and
- communicating, by the slice circuitry, the radio resource allocations to the base stations for independent and application specific customization of radio resources within an allocated slice.

\* \* \* \* \*